(12) United States Patent
Yasuda et al.

(10) Patent No.: US 12,208,968 B2
(45) Date of Patent: Jan. 28, 2025

(54) STRUCTURE OBTAINED BY COMBINING CONVEYOR BELT AND SHUTTER DEVICE, AND SHUTTER DEVICE

(71) Applicant: HYTEM CO., LTD., Kakamigahara (JP)

(72) Inventors: Katsuhiko Yasuda, Gifu (JP); Yoshihito Osada, Gifu (JP)

(73) Assignee: HYTEM CO., LTD., Kakamigahara (JP)

( * ) Notice: Subject to any disclaimer, the term of this patent is extended or adjusted under 35 U.S.C. 154(b) by 0 days.

(21) Appl. No.: 17/920,780

(22) PCT Filed: May 7, 2021

(86) PCT No.: PCT/JP2021/017499
§ 371 (c)(1),
(2) Date: Oct. 22, 2022

(87) PCT Pub. No.: WO2022/234653
PCT Pub. Date: Nov. 10, 2022

(65) Prior Publication Data
US 2024/0217748 A1    Jul. 4, 2024

(51) Int. Cl.
*B65G 21/12*    (2006.01)
*B65G 15/60*    (2006.01)
*E05F 15/59*    (2015.01)

(52) U.S. Cl.
CPC .............. *B65G 21/12* (2013.01); *B65G 15/60* (2013.01); *E05F 15/59* (2015.01)

(58) Field of Classification Search
CPC ........ B65G 21/12; B65G 15/60; B65G 21/00; B65G 21/10; B65G 49/00; B65G 2201/04; B65G 2812/02009; E05F 15/59; E05F 15/57; E05F 15/665; E05F 15/673; E05Y 2201/696; E05Y 2999/00; A01K 31/04

See application file for complete search history.

(56) References Cited

U.S. PATENT DOCUMENTS 4,753,337 A * 6/1988 Grosjean .................... F27B 9/38
                                                                            198/950
4,792,270 A * 12/1988 Yoshida ............... B65G 1/1371
                                                                            700/214
5,373,932 A * 12/1994 Stobich .................... A62C 2/18
                                                                            198/950

(Continued)

FOREIGN PATENT DOCUMENTS

CH           686929 A5 *  8/1996  ............... A62C 2/22
JP     47-021441 U1   11/1972

(Continued)

*Primary Examiner* — Mark A Deuble
(74) *Attorney, Agent, or Firm* — Yoshida & Associates LLC; Ken I Yoshda

(57) ABSTRACT

A shutter device, used to open and close an opening provided in a wall with a conveyor belt extending through the opening, includes a pair of posts, an upper shutter and a lower shutter that are movable up and down between the pair of posts, and a lifting-and-lowering mechanism that includes a feed screw having an upper external thread and a lower external thread that are twisted in opposite directions; an upper nut; and a lower nut so as to cause the upper shutter and the lower shutter to move up and down simultaneously.

5 Claims, 4 Drawing Sheets

(56) References Cited

U.S. PATENT DOCUMENTS

| | | | | |
|---|---|---|---|---|
| 5,787,716 | A * | 8/1998 | Allen, Jr. | F25D 3/127 |
| | | | | 62/381 |
| 8,447,426 | B2 * | 5/2013 | Mougin | F16P 3/08 |
| | | | | 414/137.1 |
| 9,630,035 | B2 * | 4/2017 | Muehlstein | B65G 21/2072 |
| 12,005,280 | B2 * | 6/2024 | Walker | E05F 15/72 |
| 12,006,158 | B2 * | 6/2024 | Miyamoto | B65G 21/12 |
| 2022/0186554 | A1 * | 6/2022 | Choi | H01L 21/67727 |
| 2022/0289489 | A1 * | 9/2022 | Miyahara | B65G 41/002 |

FOREIGN PATENT DOCUMENTS

| | | |
|---|---|---|
| JP | 01-019030 B2 | 10/1983 |
| JP | 59-018717 A | 2/1984 |
| JP | 63-031596 Y2 | 7/1986 |
| JP | 01-171575 A | 7/1989 |
| JP | 2555989 Y2 | 9/1993 |
| JP | 06-014607 U1 | 2/1994 |
| JP | 2005-13569 A | 1/2005 |
| JP | 6472542 B2 | 6/2017 |

\* cited by examiner

STRUCTURE OBTAINED BY COMBINING CONVEYOR BELT AND SHUTTER DEVICE, AND SHUTTER DEVICE

BACKGROUND OF THE INVENTION

Field of the Invention

The present invention relates to a structure obtained by combining a conveyor belt and a shutter device that is configured to open and close an opening provided in a wall with the conveyor belt extending through the opening, and to a shutter device to be combined with a conveyor belt.

Description of the Related Art

Large-scale poultry facilities employ various conveyors such as conveyor belts for conveying excrement (manure) of poultry being raised in cages, conveyor plates for conveying and drying poultry manure, and conveyor bars for conveying eggs laid by poultry being raised in cages. Such a conveyor may be installed to define a conveying path that extends through a plurality of spaces separated from one another by walls. That is, the conveyor may be used along a conveying path that extends through an opening provided in a wall.

In such a case, the opening is desired not to be open when the conveyor is not in operation. In particular, an opening provided in a wall between a space inside a building and a space outside the building may allow foreign matter such as dust or small animals to enter the space inside the building with high probability.

Accordingly, the present applicant has already proposed a shutter device intended for a conveyor bar extending through an opening provided in a wall, the shutter device being capable of opening and closing a space above a conveying path at the opening (see PTL 1). In this proposal, a shutter is inserted from above and between two bars that are included in the conveyor bar and are located adjacent to each other, whereby the space above the conveying path at the opening is closed. That is, the shutter device disclosed by PTL 1 is dedicated to conveyor bars.

However, the conveyors employed in poultry facilities in which conveying paths extend through openings provided in walls as described above are not limited to conveyor bars. In particular, conveyor belts for conveying poultry manure are widely used in large-scale poultry facilities. Therefore, the technique of preventing the entry of foreign matter or small animals through an opening provided in a wall has been demanded in the field of conveyor belts as well.

CITATION LIST

Patent Literature

PTL 1: Japanese Patent No. 6472542

SUMMARY OF THE INVENTION

In view of the above circumstances, an object of the present invention is to provide a structure obtained by combining a conveyor belt and a shutter device that is capable of opening and closing an opening provided in a wall with the conveyor belt extending through the opening, and a shutter device to be combined with a conveyor belt.

To solve the above problem, a structure obtained by combining a conveyor belt and a shutter device (also simply referred to as "combined structure") according to the present invention includes:

"a conveyor belt extending through an opening provided in a wall; and a shutter device,
wherein the conveyor belt includes a frame that supports an endless belt, the frame including horizontally extending side bars that each include a discontinuous part providing a frame-less space where the frame is absent and only the endless belt is present, the frame-less space being made to face the opening,
wherein the shutter device includes an upper shutter that is movable up and down, and a lower shutter that is stationary or a lower shutter that is movable up and down, and
wherein the upper shutter and the lower shutter are provided in the frame-less space and are configured to close spaces above and below the endless belt at the opening when at least the upper shutter is lowered and is made to nip the endless belt in cooperation with the lower shutter such that a conveying belt portion and a returning belt portion of the endless belt are brought into contact with each other, and to open the opening when at least the upper shutter is lifted."

The "conveying belt portion" of the endless belt, which is made to circulate, refers to an upper portion that receives and conveys conveying objects placed thereon. That is, the "conveying belt portion" refers to a portion where the belt advances from the upstream end to the downstream end. On the other hand, the "returning belt portion" refers to a lower portion where the belt having finished the conveyance of the conveying objects advances from the downstream end and returns to the upstream end.

While the conveyor bar is configured for one-way conveyance of the conveying objects, the conveyor belt includes an endless belt that is made to circulate. The circulating endless belt has a large air gap between the conveying belt portion and the returning belt portion. Therefore, to close an opening provided in a wall (hereinafter also referred to as "wall opening") with the conveyor belt extending through the wall opening, not only the space above the conveying belt portion but also the space below the returning belt portion and the space between the conveying belt portion and the returning belt portion need to be closed. The space between the conveying belt portion and the returning belt portion is enclosed by the endless belt and is therefore difficult to close by some kind of member.

In view of the above, the present invention has employed a highly novel technique in which the conveying belt portion and the returning belt portion are nipped between an upper shutter and a lower shutter in such a manner as to be brought into contact with each other. The upper shutter is movable up and down, whereas the lower shutter may be either stationary or movable up and down. If the lower shutter is movable up and down, the conveying belt portion is pushed down by the upper shutter and the returning belt portion is pushed up by the lower shutter. Thus, the conveying belt portion and the returning belt portion are brought into contact with each other to be nipped between the upper shutter and the lower shutter. If the lower shutter is stationary, the lower shutter is positioned below but close to the returning belt portion to such an extent as not to interrupt the rotation of the endless belt. In such an arrangement, the conveying belt portion is pushed down by the upper shutter to be brought into contact with the returning belt portion. Then, the conveying belt portion and the returning belt portion are further pushed down by the upper shutter. Thus, the conveying belt portion and the returning belt portion are nipped between the upper shutter and the lower shutter.

In the conveyor belt, the conveying belt portion and the returning belt portion are allowed to be brought into contact with each other by, for example, utilizing a natural bend in the endless belt or by making such a bend in the endless belt greater with some of carrier rollers that support the conveying belt portion removed.

In the conveyor belt, the frame supporting the endless belt inevitably projects upward and downward relative to the belt surface. In view of such a configuration, the conveyor belt employed in the present invention has the frame-less space where the frame is absent and only the endless belt is present. The frame-less space is provided at a position where the upper shutter and the lower shutter of the shutter device are to be moved up and down. Therefore, the endless belt can be tightly nipped from above and below, causing no interference between the frame and the upper and lower shutters and leaving no spaces above and below the endless belt.

The structure obtained by combining a conveyor belt and a shutter device according to the present invention may further be configured as follows:

"the upper shutter and the lower shutter of the shutter device are both movable up and down," and "when the upper shutter is lowered and the lower shutter is lifted, the endless belt is nipped between the upper shutter and the lower shutter such that the conveying belt portion and the returning belt portion are brought into contact with each other."

The above describes a configuration in which a shutter device including an upper shutter and a lower shutter that are both movable up and down is combined with a conveyor belt. The returning belt portion can be brought close to the conveying belt portion by pushing up the returning belt portion with the lower shutter. Therefore, even if the bend in the conveying belt portion is small, the conveying belt portion can be easily brought into contact with the returning belt portion, unlike the case where the lower shutter is stationary.

The structure obtained by combining a conveyor belt and a shutter device according to the present invention may further be configured as follows:

"the shutter device includes a feed screw having external threads respectively provided in an upper portion and a lower portion of the feed screw and twisted in opposite directions; an upper nut fixed to the upper shutter and being movable along the external thread provided in the upper portion; and a lower nut fixed to the lower shutter and being movable along the external thread provided in the lower portion," and "when the feed screw is rotated in one direction, the upper shutter and the lower shutter simultaneously move up and down in such a manner as to go away from or toward each other."

If the upper shutter and the lower shutter are individually moved up and down by respective mechanisms, the configuration of the shutter device becomes complicated. In particular, the mechanism that moves only the lower shutter up and down needs to be provided in an area below the conveyor belt. However, a typical environment for installing the conveyor belt does not provide enough room in the area below the conveyor belt.

In view of the above, the present configuration employs the feed screw having external threads respectively provided in an upper portion and a lower portion of the feed screw and twisted in opposite directions. Therefore, simply rotating the feed screw in one direction causes the upper shutter and the lower shutter to simultaneously move up and down but in opposite directions. Thus, the configuration of the shutter device is simplified, and the mechanism of moving the upper shutter and the lower shutter can be provided by utilizing a space above the conveyor belt where enough room tends to be provided.

The structure obtained by combining a conveyor belt and a shutter device according to the present invention may further be configured as follows:

"the shutter device has cuts in posts that support the upper shutter and the lower shutter," and "ends of the side bars of the conveyor belt that face the frame-less space are held in the cuts."

According to the present invention, the upper shutter and the lower shutter of the shutter device need to be correctly positioned in the frame-less space of the conveyor belt. In the present configuration, the ends of the side bars of the frame of the conveyor belt that face the frame-less space are held in the cuts provided in the posts of the shutter device. Thus, the conveyor belt and the shutter device are set in correct positions relative to each other easily and stably.

A shutter device according to the present invention is

"a shutter device used to open and close an opening provided in a wall with a conveyor belt extending through the opening, the shutter device comprising:

a pair of posts;

an upper shutter and a lower shutter that are movable up and down between the pair of posts; and a lifting-and-lowering mechanism configured to cause the upper shutter and the lower shutter to move up and down simultaneously or individually."

The above describes a configuration of the shutter device to be combined with the conveyor belt in the above-described combined structure in which the upper shutter and the lower shutter are both movable up and down.

The shutter device according to the present invention may further be configured as follows:

"the lifting-and-lowering mechanism includes a feed screw having external threads respectively provided in an upper portion and a lower portion of the feed screw and twisted in opposite directions; an upper nut fixed to the upper shutter and being movable along the external thread provided in the upper portion; and a lower nut fixed to the lower shutter and being movable along the external thread provided in the lower portion," and "when the feed screw is rotated in one direction, the upper shutter and the lower shutter are simultaneously moved up and down in such a manner as to go away from or toward each other."

The above describes a configuration of a shutter device including a feed screw that serves as a lifting-and-lowering mechanism and has external threads provided in an upper portion and a lower portion of the feed screw and twisted in opposite directions. Thus, the upper shutter and the lower shutter are simultaneously movable up and down.

The shutter device according to the present invention may alternatively be configured as follows:

"the lifting-and-lowering mechanism includes a pneumatic cylinder or a hydraulic cylinder configured to cause the upper shutter to move up and down; and a pneumatic cylinder or a hydraulic cylinder configured to cause the lower shutter to move up and down."

The above describes a configuration of a shutter device in which the upper shutter and the lower shutter are moved up and down individually by respective pneumatic or hydraulic cylinders.

Accordingly, the present invention provides a structure obtained by combining a conveyor belt and a shutter device that is capable of opening and closing an opening provided in a wall with the conveyor belt extending through the opening, and a shutter device to be combined with a conveyor belt.

DESCRIPTION OF THE EMBODIMENTS

Figure 1A:
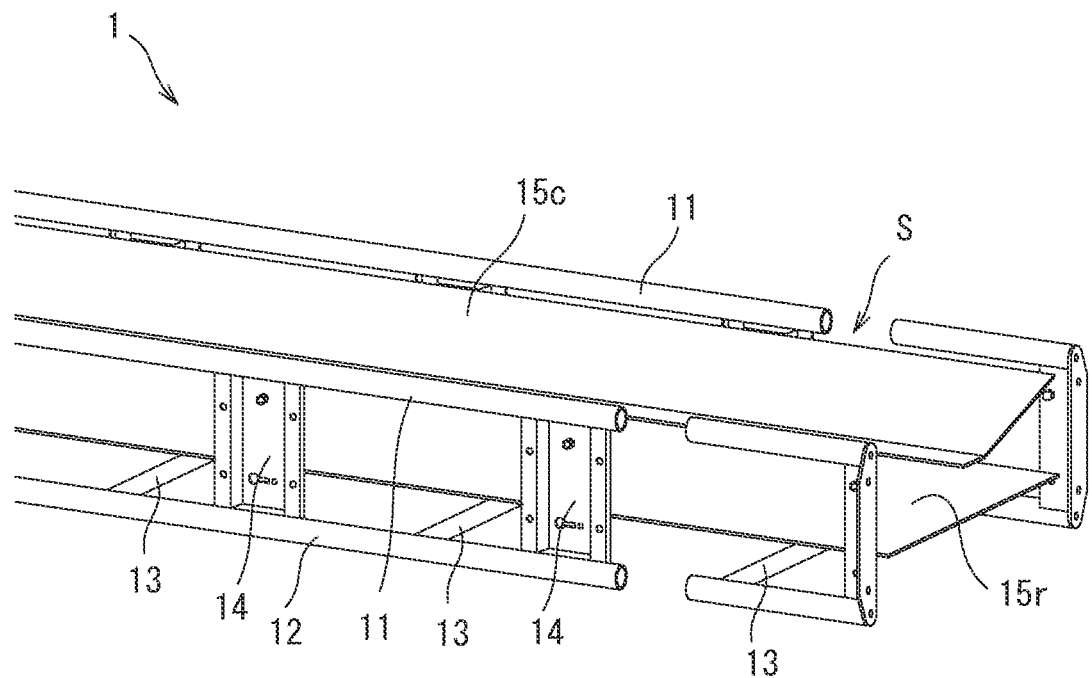
FIG. 1A is a perspective view of a part of a conveyor belt to be combined with a shutter device according to an embodiment of the present invention.
Figure 1B:
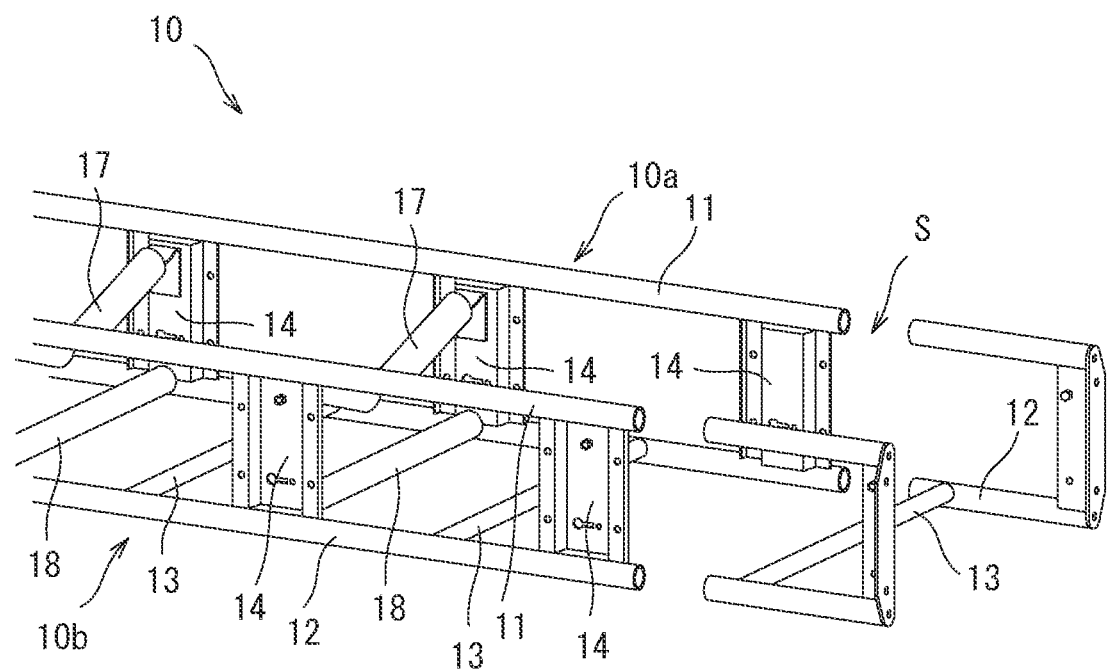
FIG. 1B is a perspective view of a frame in the part.

A combined structure according to a specific embodiment of the present invention will now be described with reference to the drawings. The combined structure includes a conveyor belt 1 and a shutter device 5, which is intended for conveyor belts. Hereinafter, a horizontal direction that is orthogonal to the conveying direction in the conveyor belt 1 is referred to as "lateral direction".

The conveyor belt 1 includes an endless belt 15 and a frame 10. The frame 10 includes two side frames 10a and 10b, which are spaced apart from each other in the lateral direction; and lateral connecting members 13, which connect the side frames 10a and 10b to each other.

The side frames 10a and 10b each include an upper side bar 11 and a lower side bar 12, which each extend in the conveying direction and have a long length; and a plurality of vertical connecting members 14, which connect the upper side bar 11 and the lower side bar 12 to each other. The lateral connecting members 13 connect the lower side bar 12 of the side frame 10a on one side and the lower side bar 12 of the side frame 10b on the other side to each other at a plurality of positions. The upper side bars 11 and the lower side bars 12 correspond to the "side bars" according to the present invention.

The frame 10 supports the endless belt 15 above the lateral connecting members 13 and between the right and left side frames 10a and 10b. In the present embodiment, the endless belt 15 is made to be around a pair of pulleys (not illustrated). A circulation driving mechanism (not illustrated) that causes the endless belt 15 to circulate is also supported by the frame 10. One of the pair of pulleys is rotatably supported by the frame 10 at the upstream end in the conveying direction, and the other pulley is rotatably supported by the frame 10 at the downstream end. The conveyor belt 1 further includes carrier rollers 17 and return rollers 18. The endless belt 15 that is caused to circulate includes a conveying belt portion 15c and a returning belt portion 15r. The carrier rollers 17 support the conveying belt portion 15c. The return rollers 18 support the returning belt portion 15r. The carrier rollers 17 and the return rollers 18 are both rotatably supported between the right and left side frames 10a and 10b with the aid of the vertical connecting members 14.

A portion of each of the upper side bars 11 and the lower side bars 12 on the right and left sides is cut off by a length of 5 cm to 15 cm to be discontinuous in an area where the lateral connecting members 13, the vertical connecting members 14, the carrier rollers 17, and the return rollers 18 are absent. Thus, a frame-less space S is provided in a section of the conveyor belt 1 that is taken in the lateral direction. In the frame-less space S, the frame 10 is absent and only the endless belt 15 is present.

The shutter device 5 includes a pair of posts 51, which are laterally spaced apart from each other; an upper shutter 61 and a lower shutter 62, which are provided between the pair of posts 51 and are slidable in an up-and-down direction; and a lifting-and-lowering mechanism, which causes the upper shutter 61 and the lower shutter 62 to move up and down. The posts 51 stand vertically on an installation surface and each include a center wall 51c and side walls 51d. The side walls 51d are provided on two opposite sides of the center wall 51c and extend therefrom in the same direction. Accordingly, each of the posts 51 has a rectangular-U-shaped cross section. The pair of posts 51 have respective U-shaped openings 51r, which are open toward each other.

The upper shutter 61 includes a flat plate-like shutter body 61m, and rectangular cylindrical slide members 61s. The slide members 61s are respectively provided on the right and left sides of the shutter body 61m. Likewise, the lower shutter 62 includes a flat plate-like shutter body 62m, and rectangular cylindrical slide members 62s. The slide members 62s are respectively provided on the right and left sides of the shutter body 62m. The slide members 61s and 62s are sized and shaped to be slidably fitted in the openings 51r of the posts 51. That is, the openings 51r of the posts 51 serve as rails that allow the slide members 61s and 62s to slide.

The lateral lengths of the shutter bodies 61m and 62m and the distance between the pair of posts 51 are made to match with the distance between the right and left side frames 10a and 10b of the conveyor belt 1. The two side walls 51d of each of the posts 51 have semicircular cuts 51n, which are provided at positions where the upper side bar 11 and the lower side bar 12 of the conveyor belt 1 are located. The cuts 51n are each sized to be able to receive a corresponding one of the upper side bar 11 and the lower side bar 12.

The lifting-and-lowering mechanism includes a pair of feed screws 52. One of the feed screws 52 extends along one of the side walls 51d of the left post 51. The other feed screw 52 extends along one of the side walls 51d of the right post 51. The two feed screws 52 are provided on the same side of the respective posts 51 in the conveying direction and extend in the up-and-down direction.

The feed screws 52 each have in a portion above the center thereof an external thread 52a, and in a portion below the center thereof an external thread 52b. Hereinafter, the external thread 52a provided in the upper portion is referred to as "upper external thread 52a", and the external thread 52b provided in the lower portion is referred to as "lower external thread 52b".

The upper external thread 52a and the lower external thread 52b have the same pitch but are twisted in opposite directions (helical in opposite directions). An upper nut 53a is screwed on the upper external thread 52a. A lower nut 53b is screwed on the lower external thread 52b. The upper nut 53a and the lower nut 53b have respective stoppers 54a and 54b, which are fixed to and stop the rotation of the respective nuts 53a and 53b. The stoppers 54a and 54b include respective portions that are in surface contact with the side wall 51d of the post 51. Since the portions interfere with the side wall 51d, the rotation of the upper nut 53a and the lower nut 53b is stopped.

In the above configuration, when the feed screws 52 are rotated in one direction, the non-rotatable upper nuts 53a move downward along the respective upper external threads 52a and the non-rotatable lower nuts 53b move upward along the respective lower external threads 52b by the same length. When the feed screws 52 are rotated in the reverse direction, the upper nuts 53a move upward along the upper external threads 52a and the lower nuts 53b move downward along the lower external threads 52b by the same length.

The upper nuts 53a on the right and left feed screws 52 are fixed to the upper shutter 61 with fastening members (not illustrated). The lower nuts 53b on the right and left feed screws 52 are fixed to the lower shutter 62.

The shutter device 5 further includes a top plate 79, which is intended to be fixed to a wall having an opening through which the conveyor belt 1 is made to extend or to a structure projecting from the ceiling near the wall. The top plate 79 is provided with a pulley 71. The output shaft of a motor 70 rotatably extends through the top plate 79 from below. The pulley 71 rotates together with the output shaft of the motor 70. The right and left feed screws 52 also rotatably extend through the top plate 79 from below. One of the feed screws 52 is provided with a pulley 72. The other feed screw 52 is provided with a pulley 73. The feed screws 52 rotate together with the respective pulleys 72 and 73. The pulley 72 includes a portion around which an endless belt (not illustrated) that is stretched between and circulates between the pulley 72 and the pulley 71 is wound, and a portion around which an endless belt (not illustrated) that is stretched between and circulates between the pulley 72 and the pulley 73 is wound.

Therefore, when the motor 70 is activated, the rotation of the output shaft of the motor 70 is transmitted through the pulleys 71 and 72 to a corresponding one of the feed screws 52 and through the pulleys 71 to 73 to the other feed screw 52, causing the right and left feed screws 52 to simultaneously rotate in the same direction and at the same speed.

Accordingly, when the output shaft of the motor 70 is rotated in one direction, the right and left feed screws 52 rotate in the same direction, whereby the right and left upper nuts 53a move downward to lower the upper shutter 61 and the right and left lower nuts 53b move upward to lift the lower shutter 62. On the other hand, when the output shaft of the motor 70 is rotated in the reverse direction, the right and left feed screws 52 rotate in the reverse direction, whereby the right and left upper nuts 53a move upward to lift the upper shutter 61 and the right and left lower nuts 53b move downward to lower the lower shutter 62. The upper shutter 61 and the lower shutter 62 simultaneously move up and down at the same speed but in opposite directions.

The conveyor belt 1 to be used in combination with the shutter device 5 configured as above is made to extend through a wall opening so that conveying objects are conveyed from one of two spaces separated from each other by a wall to the other space. The conveyor belt 1 is positioned such that the frame-less space S is made to be face the wall opening.

The shutter device 5 is installed such that the pair of posts 51 stand in the frame-less space S. If the horizontal length of the frame-less space S is made substantially equal to the distance between the pair of side walls 51d of each of the posts 51, the ends of the upper side bars 11 and the lower side bars 12 that face the frame-less space S can be held in the cuts 51n provided in the posts 51. Thus, the shutter device 5 and the conveyor belt 1 are set in correct positions relative to each other easily and stably. Furthermore, if the depth by which the ends of the upper side bars 11 and the lower side bars 12 are to be fitted into the cuts 51n is set within the thickness of the side walls 51d, the interference between the slide members 61s and the upper side bars 11 and the interference between the slide members 62s and the lower side bars 12 are prevented. Note that each of the posts 51 is to be in contact with the wall having the opening at one of the side walls 51d that is opposite the one along which the feed screw 52 extends.

Figures 4A, 4B:
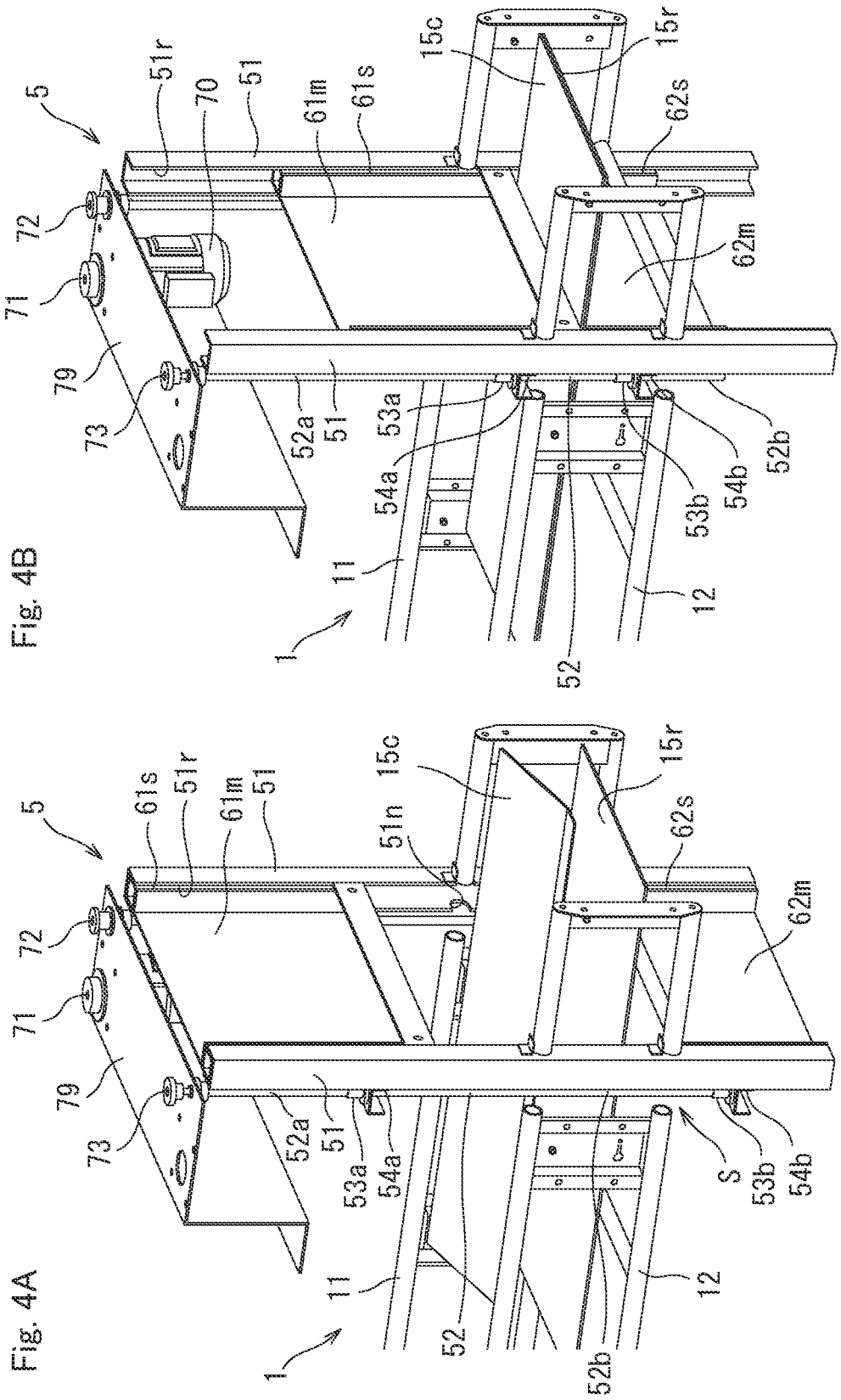
FIG. 4A illustrates a state of a combined structure when a wall opening is open.
FIG. 4B illustrates a state of the combined structure when the wall opening is closed.

While conveying objects are being conveyed by the conveyor belt 1, as illustrated in FIG. 4A, the upper shutter 61 is kept lifted and the lower shutter 62 is kept lowered. Thus, the conveying objects placed on the conveying belt portion 15c are conveyable through the space provided between the upper shutter 61 and the lower shutter 62. In such a state, the conveying belt portion 15c and the returning belt portion 15r of the endless belt 15 are spaced apart from each other.

Figure 2A:
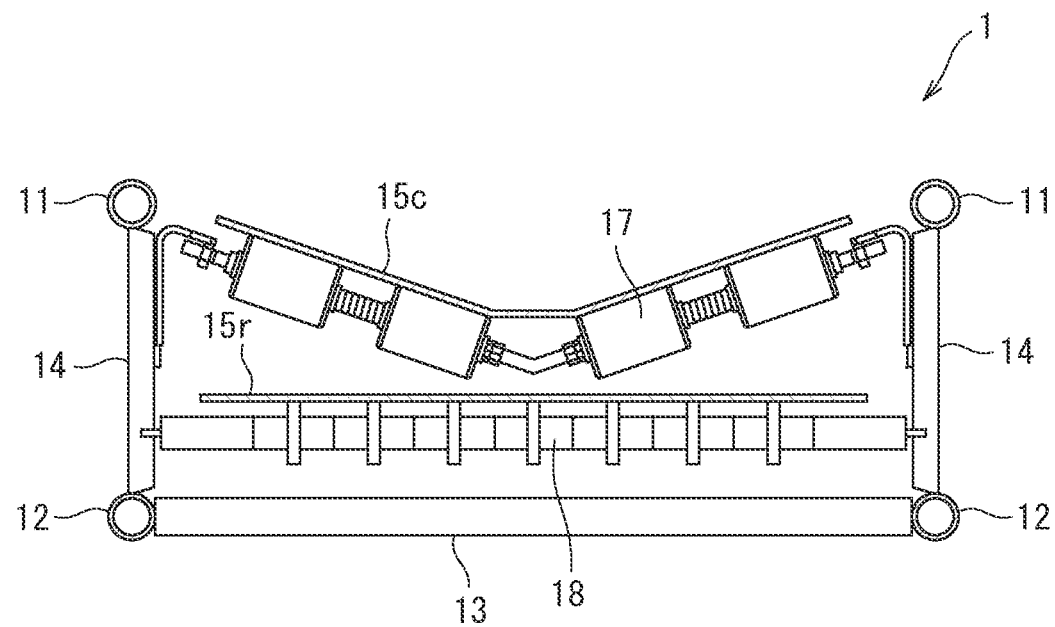
FIG. 2A is a sectional view of the conveyor belt illustrated in FIG. 1A.
Figure 2B:
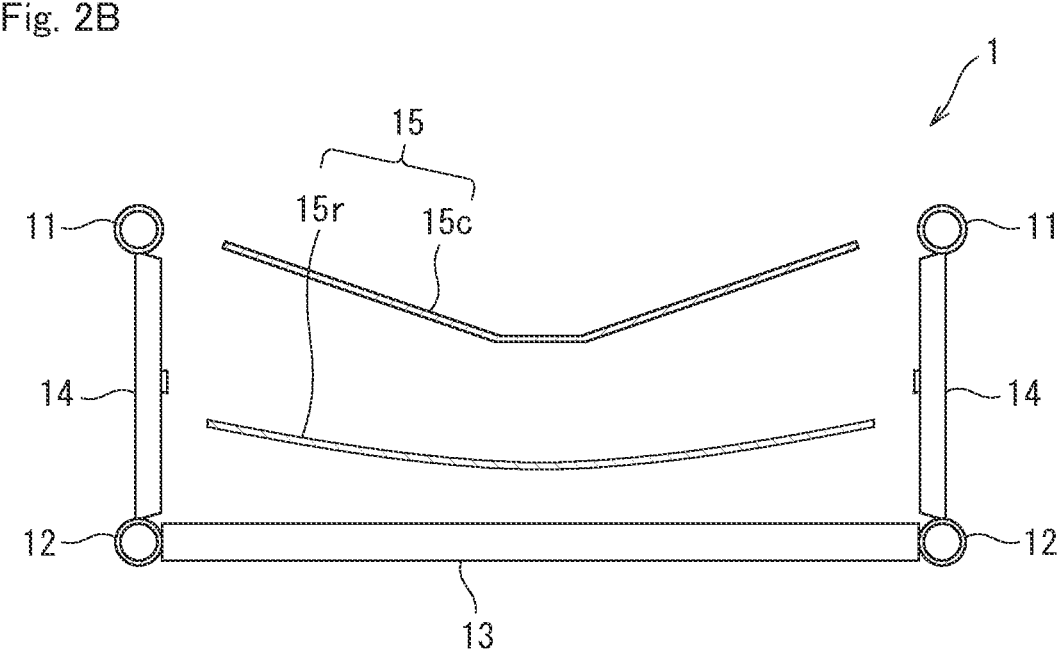
FIG. 2B is a sectional view of the conveyor belt with carrier rollers and return rollers not illustrated.
Figure 3:
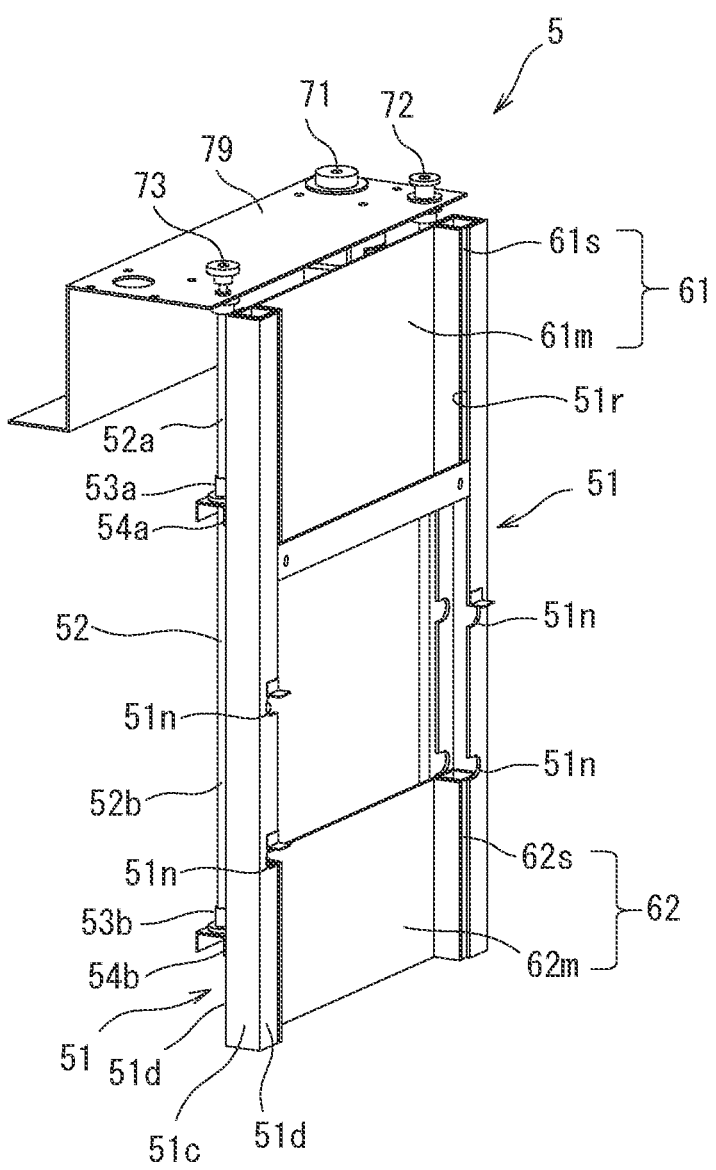
FIG. 3 is a perspective view of a shutter device according to the embodiment.

While the conveyor belt 1 is stopped (not in operation), as illustrated in FIG. 4B, the upper shutter 61 is kept lowered and the lower shutter 62 is kept lifted, whereby the endless belt 15 is nipped therebetween. Typically, as illustrated in FIG. 2A, the conveyor belt 1 employs shallow-V-shaped carrier rollers 17. Therefore, the conveying belt portion 15c is bent in portions thereof where the carrier rollers 17 are absent. Likewise, as illustrated in FIG. 2B, the returning belt portion 15r is typically bent under its own weight in portions thereof where the return rollers 18 are absent. Hence, the conveying belt portion 15c and the returning belt portion 15r can be brought into contact with and pressed against each other from above and below by the upper shutter 61 and the lower shutter 62 to be nipped therebetween. If one or more of the carrier rollers 17 are removed from the frame 10 near the wall opening, the bend in the conveying belt portion 15c can be made greater.

The sizes of the upper shutter 61 and the lower shutter 62 are set such that, with the conveying belt portion 15c and the returning belt portion 15r being nipped tightly by the upper shutter 61 and the lower shutter 62, the upper end of the upper shutter 61 is located above the upper end of the wall opening and the lower end of the lower shutter 62 is located below the lower end of the wall opening. Thus, the wall opening is closed between the pair of posts 51 by the upper shutter 61 and the lower shutter 62 that are pressed against each other with the endless belt 15 in between. Consequently, while the conveyor belt 1 is not in operation, the entry of foreign matter or small animals through the wall opening where the conveyor belt 1 extends is prevented.

To restart the operation of the conveyor belt 1, the upper shutter 61 is lifted and the lower shutter 62 is lowered, whereby the two shutters 61 and 62 are spaced apart from each other as described above with reference to FIG. 4A.

To summarize, combining the shutter device 5 with the conveyor belt 1 extending through a wall opening allows the wall opening to be kept open while the conveyor belt 1 is in operation but to be kept closed while the conveyor belt 1 is not in operation. Since the conveyor belt 1 has the frame-less space S where the upper shutter 61 and the lower shutter 62 are to be moved up and down, the conveying belt portion 15c and the returning belt portion 15r can be nipped from above and below to be tightly in contact with each other. Thus, the space above the conveying belt portion 15c, the space below the returning belt portion 51r, and the space between the conveying belt portion 15*c* and the returning belt portion 15*r* can be eliminated at a time, whereby the wall opening is closed.

The shutter device 5 according to the present embodiment employs the feed screws 52 each including the upper external thread 52*a* and the lower external thread 52*b* twisted in opposite directions so that the upper shutter 61 and the lower shutter 62 are to be moved in opposite directions. Therefore, rotating the single feed screw 52 in one direction causes the upper shutter 61 and the lower shutter 62 to simultaneously move up and down in such a manner as to go away from or toward each other. Moreover, such up-and-down motions of the upper shutter 61 and the lower shutter 62 can be made by the single motor 70.

Furthermore, an existing conveyor belt can be combined with the shutter device 5 by simply cutting off a portion of the frame of the conveyor belt to provide a frame-less space S. Therefore, the wall opening can be made openable and closable by simply introducing only the shutter device 5, without wasting existing facilities.

While the present invention has been described above by taking a preferable embodiment as an example, the present invention is not limited to the above embodiment. Various improvements and design changes can be made to the above embodiment without departing from the aspect thereof.

For example, while the above embodiment relates to a case where the rotation of the output shaft of the motor 70 is transmitted to the feed screws 52 through the pulleys 71 and 72 or the pulleys 71 to 73, a gear mechanism configured to increase or decrease the rotation speed of the motor may be added.

Furthermore, while the above embodiment relates to a case where the upper shutter 61 and the lower shutter 62 are both movable up and down, the lower shutter may be stationary but be positioned slightly below the returning belt portion 15*r*.

Note that the conveyor belt to be combined with the shutter device 5 is not limited to those configured to convey poultry manure in poultry facilities and is widely applicable to conveyor belts each being configured to convey any conveying object through a plurality of spaces that are separated from one another by walls.

What is claimed is:

1. A structure obtained by combining a conveyor belt and a shutter device, the structure comprising:
    a conveyor belt extending through an opening provided in a wall; and a shutter device,
    wherein the conveyor belt includes a frame that supports an endless belt, the frame including horizontally extending side bars that each include a discontinuous part providing a frame-less space where the frame is absent and only the endless belt is present, the frame-less space being made to face the opening,
    wherein the shutter device includes an upper shutter that is movable up and down, and a lower shutter that is stationary or a lower shutter that is movable up and down, and
    wherein the upper shutter and the lower shutter are provided in the frame-less space and are configured to close spaces above and below the endless belt at the opening when at least the upper shutter is lowered and is made to nip the endless belt in cooperation with the lower shutter such that a conveying belt portion and a returning belt portion of the endless belt are brought into contact with each other, and to open the opening when at least the upper shutter is lifted.

2. The structure obtained by combining a conveyor belt and a shutter device according to claim 1,
    wherein the upper shutter and the lower shutter of the shutter device are both movable up and down, and
    wherein when the upper shutter is lowered and the lower shutter is lifted, the endless belt is nipped between the upper shutter and the lower shutter such that the conveying belt portion and the returning belt portion are brought into contact with each other.

3. The structure obtained by combining a conveyor belt and a shutter device according to claim 2,
    wherein the shutter device includes
    a feed screw having external threads respectively provided in an upper portion and a lower portion of the feed screw and twisted in opposite directions; an upper nut fixed to the upper shutter and being movable along the external thread provided in the upper portion; and a lower nut fixed to the lower shutter and being movable along the external thread provided in the lower portion, and
    wherein when the feed screw is rotated in one direction, the upper shutter and the lower shutter simultaneously move up and down in such a manner as to go away from or toward each other.

4. The structure obtained by combining a conveyor belt and a shutter device according to claim 1,
    wherein the shutter device has cuts in posts that support the upper shutter and the lower shutter, and
    wherein ends of the side bars of the conveyor belt that face the frame-less space are held in the cuts.

5. A shutter device used to open and close an opening provided in a wall with a conveyor belt extending through the opening, the shutter device comprising:
    a pair of posts;
    an upper shutter and a lower shutter that are movable up and down between the pair of posts; and
    a lifting-and-lowering mechanism configured to cause the upper shutter and the lower shutter to move up and down simultaneously,
    wherein the lifting-and-lowering mechanism includes a feed screw having external threads respectively provided in an upper portion and a lower portion of the feed screw and twisted in opposite directions; an upper nut fixed to the upper shutter and being movable along the external thread provided in the upper portion; and a lower nut fixed to the lower shutter and being movable along the external thread provided in the lower portion, and
    wherein when the feed screw is rotated in one direction, the upper shutter and the lower shutter are simultaneously moved up and down in such a manner as to go away from or toward each other.

\* \* \* \* \*